(12) United States Patent
Bieske et al.

(10) Patent No.: US 11,489,553 B1
(45) Date of Patent: Nov. 1, 2022

(54) SYSTEM AND METHOD FOR IDENTIFYING A CONNECTION BETWEEN A POWER DISTRIBUTION UNIT AND AN ELECTRIC DEVICE

(71) Applicant: OVH, Roubaix (FR)

(72) Inventors: Michel Bieske, Wasquehal (FR); Sylvain Chenot, Hem (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 17/229,694

(22) Filed: Apr. 13, 2021

(51) Int. Cl.
*H04B 3/54* (2006.01)

(52) U.S. Cl.
CPC .................. *H04B 3/542* (2013.01)

(58) Field of Classification Search
CPC .......... H04B 3/542; H04B 3/544; H04B 3/54; H04L 9/32
See application file for complete search history.

(56) References Cited

U.S. PATENT DOCUMENTS

| | | | |
|---|---|---|---|
| 4,041,381 A | 8/1977 | Hwa | |
| 5,319,571 A | 6/1994 | Langer et al. | |
| 6,400,802 B1 | 6/2002 | Legare | |
| 6,417,672 B1 | 7/2002 | Chong | |
| 6,574,576 B2 | 6/2003 | Chen et al. | |
| 6,690,177 B2 | 2/2004 | Dalebroux | |
| 6,917,888 B2 | 7/2005 | Logvinov et al. | |
| 7,030,734 B2 | 4/2006 | Butler et al. | |
| 7,030,771 B2 | 4/2006 | Kinnard et al. | |
| 7,031,859 B2 | 4/2006 | Piesinger | |
| 7,034,663 B2 | 4/2006 | Mansfield et al. | |
| 7,203,849 B2 | 4/2007 | Dove | |
| 7,254,511 B2 | 8/2007 | Niedzwiecki et al. | |

(Continued)

FOREIGN PATENT DOCUMENTS

| | | |
|---|---|---|
| CN | 1725707 A | 1/2006 |
| CN | 1917433 A | 2/2007 |

(Continued)

OTHER PUBLICATIONS

Galli et al., "For the Grid and Through the Grid: The Role of Power Line Communications in the Smart Grid", The Proceedings of the IEEE, 2011, pp. 1-26.

(Continued)

*Primary Examiner* — Aristocratis Fotakis
(74) *Attorney, Agent, or Firm* — BCF LLP

(57) ABSTRACT

A connection between a power distribution unit (PDU) and an electric device is identified by generating a data packet containing an identity of the electric device, transmitting the data packet by varying, on a power line connecting an output socket of the PDU to the electric device, a power level between distinct intensities for transmitting distinct logical values of the data packet, sensing, at the PDU, the power level on the power line, reporting, to an identification module, a socket number of the output socket connected to the power line and successive power level data obtained by sensing the power level on the power line, decoding the identity of the electric device by monitoring the successive power level data reported by the PDU, and storing, in a database, a reference between the identity of the electric device, an identity of the PDU, and the socket number.

22 Claims, 8 Drawing Sheets

(56) References Cited

U.S. PATENT DOCUMENTS

| | | |
|---|---|---|
| 7,269,753 B2 | 9/2007 | Farkas et al. |
| 7,308,591 B2 | 12/2007 | Dubinsky |
| 7,532,011 B2 | 5/2009 | Shi |
| 7,646,225 B2 | 1/2010 | Song et al. |
| 7,701,325 B2 | 4/2010 | White |
| 7,870,374 B2 | 1/2011 | Cagno et al. |
| 7,877,622 B2 | 1/2011 | Gruendler |
| 8,010,336 B2 | 8/2011 | Chaiquin |
| 8,077,049 B2 | 12/2011 | Yaney et al. |
| 8,165,723 B2 | 4/2012 | Nasle |
| 8,188,855 B2 | 5/2012 | Sharma |
| 8,239,073 B2 | 8/2012 | Fausak et al. |
| 8,305,737 B2 | 11/2012 | Ewing et al. |
| 8,359,177 B2 | 1/2013 | Lelong et al. |
| 8,494,661 B2 | 7/2013 | Ewing et al. |
| 8,494,686 B2 | 7/2013 | Masters et al. |
| 8,497,779 B1 | 7/2013 | Waide |
| 8,564,920 B1 | 10/2013 | Smith et al. |
| 8,635,484 B2 | 1/2014 | Turicchi et al. |
| 8,639,459 B1 | 1/2014 | Morales et al. |
| 8,726,045 B2 | 5/2014 | Goodrum et al. |
| 8,729,905 B2 | 5/2014 | McCormack et al. |
| 8,732,508 B2 | 5/2014 | Cochran et al. |
| 8,914,250 B2 | 12/2014 | Dzung et al. |
| 9,122,466 B1 | 9/2015 | Kellett et al. |
| 9,143,197 B2 | 9/2015 | Vjayasankar et al. |
| 9,182,795 B1 | 11/2015 | Hill et al. |
| 9,210,257 B2 | 12/2015 | Hall et al. |
| 9,213,380 B2 | 12/2015 | Bandholz et al. |
| 9,520,043 B1* | 12/2016 | Alshinnawi .......... G06K 7/10237 |
| 9,608,440 B2 | 3/2017 | Familiant et al. |
| 9,835,662 B2 | 12/2017 | Driscoll et al. |
| 9,841,449 B2 | 12/2017 | Mikulka et al. |
| 9,871,406 B1 | 1/2018 | Churnock et al. |
| 9,965,013 B1 | 5/2018 | McGee et al. |
| 10,459,016 B2 | 10/2019 | Driscoll et al. |
| 10,571,493 B2 | 2/2020 | Sonderegger |
| 10,831,251 B1 | 11/2020 | Ross |
| 2003/0084112 A1 | 5/2003 | Curray et al. |
| 2006/0085346 A1 | 4/2006 | Riley |
| 2007/0002506 A1 | 1/2007 | Papallo et al. |
| 2007/0054622 A1 | 3/2007 | Berkman |
| 2007/0135086 A1 | 6/2007 | Stanford |
| 2007/0162620 A1 | 7/2007 | Terry et al. |
| 2007/0189302 A1 | 8/2007 | Lee et al. |
| 2007/0191992 A1 | 8/2007 | Taliaferro |
| 2008/0221737 A1 | 9/2008 | Josephson et al. |
| 2008/0303353 A1 | 12/2008 | Yu et al. |
| 2009/0089594 A1 | 4/2009 | Cagno et al. |
| 2009/0189774 A1 | 7/2009 | Brundridge et al. |
| 2009/0207753 A1 | 8/2009 | Bieganski |
| 2009/0210178 A1 | 8/2009 | Bieganski |
| 2009/0217073 A1 | 8/2009 | Brech et al. |
| 2009/0282274 A1 | 11/2009 | Langgood et al. |
| 2009/0287943 A1 | 11/2009 | Brey et al. |
| 2009/0287949 A1 | 11/2009 | Bradicich et al. |
| 2009/0307515 A1* | 12/2009 | Bandholz .................. G06F 1/26 713/340 |
| 2010/0204850 A1 | 8/2010 | Henderieckx |
| 2011/0047188 A1 | 2/2011 | Martins et al. |
| 2011/0116387 A1 | 5/2011 | Beeco et al. |
| 2011/0167282 A1 | 7/2011 | Brown et al. |
| 2011/0218689 A1 | 9/2011 | Chan et al. |
| 2011/0320827 A1 | 12/2011 | Siegman et al. |
| 2012/0117392 A1 | 5/2012 | Turicchi et al. |
| 2012/0189042 A1 | 7/2012 | Varadarajan et al. |
| 2012/0223840 A1 | 9/2012 | Guymon et al. |
| 2012/0239958 A1 | 9/2012 | Archibald et al. |
| 2012/0330472 A1 | 12/2012 | Boot |
| 2013/0002409 A1 | 1/2013 | Molina et al. |
| 2013/0020868 A1 | 1/2013 | Wu et al. |
| 2013/0073882 A1 | 3/2013 | Inbaraj et al. |
| 2013/0123998 A1 | 5/2013 | King et al. |
| 2013/0241284 A1 | 9/2013 | Santini et al. |
| 2013/0253861 A1 | 9/2013 | Nicholson et al. |
| 2014/0115353 A1 | 4/2014 | Hutten et al. |
| 2014/0143578 A1 | 5/2014 | Cenizal et al. |
| 2014/0164812 A1 | 6/2014 | Alshinnawi et al. |
| 2014/0164814 A1 | 6/2014 | Henise et al. |
| 2014/0177736 A1 | 6/2014 | Alshinnawi et al. |
| 2014/0181564 A1 | 6/2014 | Alshinnawi et al. |
| 2014/0355610 A1 | 12/2014 | Ge et al. |
| 2015/0074431 A1 | 3/2015 | Nguyen |
| 2015/0177814 A1 | 6/2015 | Bailey et al. |
| 2015/0311649 A1* | 10/2015 | Horne .................. H01R 13/641 439/489 |
| 2016/0195911 A1 | 7/2016 | Chapel et al. |
| 2016/0337512 A1 | 11/2016 | Kalavai |
| 2016/0378631 A1 | 12/2016 | Calio et al. |
| 2017/0149243 A1 | 5/2017 | Dozier et al. |
| 2017/0185138 A1* | 6/2017 | Suzuki .................... G06F 1/266 |
| 2017/0327242 A1 | 11/2017 | Lopez et al. |
| 2018/0052431 A1 | 2/2018 | Shaikh et al. |
| 2018/0074561 A1 | 3/2018 | Wang et al. |
| 2018/0131163 A1 | 5/2018 | Jen et al. |
| 2018/0294610 A1* | 10/2018 | Lewis .................... H01R 27/02 |
| 2018/0337554 A1 | 11/2018 | Thomas et al. |
| 2018/0366885 A1* | 12/2018 | Hewitt .................. H01R 27/02 |
| 2019/0123580 A1 | 4/2019 | Bindea et al. |
| 2019/0243977 A1 | 8/2019 | Pfleger et al. |
| 2019/0377394 A1 | 12/2019 | Klaba |
| 2020/0021106 A1 | 1/2020 | Thibaut et al. |
| 2020/0042068 A1 | 2/2020 | Rong et al. |
| 2020/0142465 A1 | 5/2020 | Jenne et al. |
| 2020/0293101 A1 | 9/2020 | Krueger et al. |
| 2020/0295591 A1 | 9/2020 | Mohan et al. |
| 2021/0013735 A1 | 1/2021 | Pachoud et al. |
| 2021/0226828 A1* | 7/2021 | Wilhelmsson .......... H04L 27/04 |

FOREIGN PATENT DOCUMENTS

| | | |
|---|---|---|
| CN | 101983494 B | 8/2014 |
| CN | 110601723 A | 12/2019 |
| DE | 10112844 A1 | 9/2002 |
| EP | 0724799 A1 | 8/1996 |
| EP | 2158726 A2 | 3/2010 |
| EP | 2260611 B1 | 8/2014 |
| EP | 2863723 A2 | 4/2015 |
| EP | 2572165 B1 | 11/2017 |
| EP | 3272071 A1 | 1/2018 |
| EP | 3065250 B1 | 11/2018 |
| EP | 3595120 A1 | 1/2020 |
| FR | 3033969 B1 | 3/2017 |
| KR | 200435020 Y1 | 1/2007 |
| KR | 100849920 B1 | 8/2008 |
| WO | WO9501030 A1 | 1/1995 |
| WO | 03073177 A1 | 9/2003 |
| WO | 2006037605 A1 | 4/2006 |
| WO | 2008157668 A3 | 1/2009 |
| WO | 2009105169 A2 | 8/2009 |
| WO | 2009123586 A1 | 10/2009 |
| WO | 2010/151835 A2 | 12/2010 |
| WO | 2013111760 A1 | 8/2013 |
| WO | 2016151217 A1 | 9/2016 |
| WO | 2017158608 A1 | 9/2017 |
| WO | 2019172519 A1 | 9/2019 |

OTHER PUBLICATIONS

Peng et al., "AMI Based Sensing Architecture for Smart Grid in IPV6 Networks", International Journal on Smart Sensing and Intelligent Systems 9.4: 2111(20). Exeley Inc. (Dec. 2016), pp. 1-8.

Luka et al., "Power Line Communications: A Platform for Sustainable Development", Research Gate, 3rd International Conference of African Development Issues, 2016, pp. 46-51.

Zhang et al., "Hybrid Communication Architectures for Distributed Smart Grid Applications", Energies, MDPI, 2018, vol. 11, pp. 1-16.

Rinaldi et al., "Performance analysis of power line communication in industrial power distribution network", Computer Standards & Interfaces, 2015, vol. 42, pp. 9-16.

(56) References Cited

OTHER PUBLICATIONS

Mlynek et al., "Simulation of Achievable Data Rates of Broadband Power Line Communication for Smart Metering", Applied Sciences, MDPI, 2019, vol. 9, pp. 1-22.
European Search Report with regard to the Patent Application No. 20315274.9 completed Oct. 19, 2020.
European Search Report with regard to the Patent Application No. 20315275.6 completed Oct. 23, 2020.
English Abstract for FR3033969 retrieved on Espacenet on Jan. 19, 2021.
English Abstract for EP3065250 retrieved on Espacenet on Dec. 23, 2020.
English Abstract for CN110601723 retrieved on Espacenet on Dec. 23, 2020.
English Abstract for CN 101983494 retrieved on Espacenet on Dec. 23, 2020.
English Abstract for CN 1917433 retrieved on Espacenet on Dec. 23, 2020.
English Abstract for CN 1725707 retrieved on Espacenet on Dec. 23, 2020.
English Description and Claims for KR200435020 retrieved on Espacenet on Dec. 23, 2020.
European Search Report with regard to EP Patent Application EP 18315010 completed Aug. 7, 2018.
English Abstract of KR100849920 retrieved on Espacenet on Apr. 23, 2019.
English Abstract of DE10112844 retrieved on Espacenet on Apr. 23, 2019.
Office Action with regard to the counterpart U.S. Appl. No. 16/396,854 dated Sep. 2, 2021.
Notice of Allowance with regard to the counterpart U.S. Appl. No. 17/308,820 dated Aug. 2, 2021.

* cited by examiner

300

B

Decode, at the identification module, the identity of the electric device by monitoring the successive power level data reported by the PDU — 350

Decode an integrity check field within the data packet — 352

Verify an integrity of the decoded identity of the electric device based on the integrity check field — 356

Store, in a database, a reference between the identity of the electric device, an identity of the PDU and the socket number — 360

Figure 4c

SYSTEM AND METHOD FOR IDENTIFYING A CONNECTION BETWEEN A POWER DISTRIBUTION UNIT AND AN ELECTRIC DEVICE

FIELD

The present technology relates to electric power distribution systems and methods. In particular, the systems and methods allow identifying a connection between a power distribution unit and an electric device.

BACKGROUND

In today's data centers and processing centers, such as those used in blockchain technology, the numbers of computer servers become so large that they come to the verge of being unmanageable. In a data center, new servers may need to be added on a daily basis. Of course, some servers may fail and require maintenance or replacement.

All of these servers consume electric power provided by power sources, for example power distribution units (PDU), via cables.

Keeping track of power cabling in a data center having thousands of servers, perhaps tens of thousands of servers, becomes a daunting task. Failure of a power source may lead to the loss of several servers and it may become urgent to reallocate power to these servers. To this end, it is important to be constantly aware of which server is connected to which power source.

Given that servers are constantly added or changed in large data centers, conventional methods for identifying connections between servers and power sources are inaccurate and slow while being too manpower intensive to be of practical use.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) lack of accuracy; (2) lack of speed; and/or (3) high manpower requirements of conventional methods for identifying connections between servers and power sources.

In one aspect, various implementations of the present technology provide a method for identifying a connection between a power distribution unit (PDU) and an electric device, the method comprising:
  generating, at the electric device, a data packet comprising a field containing an identity of the electric device, the data packet being encoded in digital words;
  transmitting the data packet to the PDU by varying, by the electric device, a power level on a power line connecting an output socket of the PDU to the electric device, the power level being varied between a first intensity for transmitting first logical values of the digital words and a second intensity for transmitting second logical values of the digital words;
  sensing, at the PDU, the power level on the power line;
  reporting, from the PDU to an identification module, a socket number of the output socket of the PDU connected to the power line and successive power level data obtained by sensing the power level on the power line;
  decoding, at the identification module, the identity of the electric device by monitoring the successive power level data reported by the PDU; and
  selectively storing, in a database, a reference between the identity of the electric device, an identity of the PDU and the socket number.

In some implementations of the present technology, the data packet further comprises a start of frame field preceding the field containing the identity of the electric device; and the method further comprises detecting, at the identification module, a pattern of the reported successive power level data corresponding to the start of frame field of the data packet.

In some implementations of the present technology, the method further comprises using the reported successive power level data corresponding to the start of frame field of the data packet to calibrate the identification module.

In some implementations of the present technology, the data packet further comprises an integrity check field calculated based on the identity of the electric device; the method further comprises: decoding, at the identification module, an integrity check field within the data packet, and verifying, at the identification module, an integrity of the decoded identity of the electric device based on the integrity check field; and storing in the database the reference between the identity of the electric device, the identity of the PDU and the socket number is conditional to a successful verification of the integrity of the decoded identity of the electric device.

In some implementations of the present technology, reporting, from the PDU to the identification module, the socket number and the successive power level data further comprises reporting the identity of the PDU.

In some implementations of the present technology, the method further comprises receiving a power up trigger at the electric device, wherein the data packet is generated in response to receiving the power up trigger.

In some implementations of the present technology, the method further comprises receiving, at the electric device, the identity of the electric device before transmitting the data packet.

In some implementations of the present technology, the identity of the electric device is stored in a non-transitory memory of the electric device; and the data packet is generated at the electric device in response to receiving a control signal.

In some implementations of the present technology, the method further comprises: generating, at the electric device, a first clock sequence defining alternating phases at a first predetermined clock rate; wherein generating the data packet comprises aligning a timing of successive logical values contained in the data packet with the alternating phases of the first clock sequence.

In some implementations of the present technology, the method further comprises: generating, at the PDU, a second clock sequence defining alternating phases at a second predetermined clock rate nominally equal to the first predetermined clock rate of the first clock sequence generated at the electric device; and aggregating, at the PDU, the sensed power levels obtained over each phase of the second clock sequence to produce the successive power level data at successive phases of the second clock sequence.

In some implementations of the present technology, the method further comprises retransmitting, by the electric device, the data packet after completion of a first transmission of the data packet, logical values contained in a retransmission of the data packet being shifted from the alternating phases of the first clock sequence of the electric device by one half of a phase of the first clock sequence.

In some implementations of the present technology, the digital words are selected from 1-bit words, 2-bit-words, 3-bit words and 4-bit words; and transmitting the data packet to the PDU comprises varying the power level on the power line between a number of intensities consistent with a number of bits of the digital words.

In other aspects, various implementations of the present technology provide a power distribution system, comprising:
- a database;
- a plurality of electric devices, each electric device comprising:
  - a power input,
  - a load adapted to consume power received at the power input, and
  - a processor operatively connected to the load, the processor being configured to:
    - generate a data packet comprising a field containing an identity of the electric device,
    - encode the data packet in digital words, and
    - cause the load to vary a power level received at the power input, the power level being varied between a first intensity corresponding to first logical values of the digital words and a second intensity corresponding to second logical values of the digital words;
- a power distribution unit, PDU, comprising:
  - a plurality of output sockets connectable to power inputs of respective electric devices, via respective power lines, for providing power from the PDU to the respective electric devices, and
  - a power level sensor adapted to sense power levels at each of the output sockets and to generate successive power level data based on the sensed power levels; and
- an identification module operatively connected to the PDU, the identification module comprising a decoder adapted to:
  - receive, from the PDU:
    - a socket number of a given output socket connected via a given power line to a given electric device, and
    - successive power level data obtained on the given output socket,
  - monitor the successive power level data reported by the PDU for decoding the identity of the given electric device, and
  - transmitting, to the database, a reference between the identity of the given electric device, an identity of the PDU and the socket number.

In some implementations of the present technology, the PDU is one of a plurality of PDUs; and the PDU is configured to transmit the identity of the PDU to the identification module with the socket number of the given output socket and with the successive power level data obtained on the given output socket.

In some implementations of the present technology, the PDU is adapted to receive power from a main power source via a main power line.

In some implementations of the present technology, the database is adapted to store the reference between the identity of the electric device, the identity of the PDU and the socket number.

In some implementations of the present technology, the processor of the electric device is further configured to: generate a first clock sequence defining alternating phases at a first predetermined clock rate; and generate the data packet by aligning a timing of successive logical values contained in the data packet with the alternating phases of the first clock sequence.

In some implementations of the present technology, the PDU is further adapted to: generate a second clock sequence defining alternating phases at a second predetermined clock rate nominally equal to the first predetermined clock rate of the first clock sequence generated at each electric device; and aggregate the sensed power levels obtained over each phase of the second clock sequence to produce the successive power level data at successive phases of the second clock sequence.

In some implementations of the present technology, the processor of the electric device is further configured cause to retransmit, by the electric device, the data packet after completion of a first transmission of the data packet, logical values contained in a retransmission of the data packet being shifted from the alternating phases of the first clock sequence of the electric device by one half of a phase of the first clock sequence.

In some implementations of the present technology, the second clock sequence generated by the PDU is not synchronized with the first clock sequence generated by the processor of the electric device.

In some implementations of the present technology, the processor of the electric device is further configured to include, in the data packet, a start of frame field preceding the field containing the identity of the electric device; and the decoder is further adapted to: detect a pattern of the reported successive power level data corresponding to the start of frame field of the data packet, and use the reported successive power level data corresponding to the start of frame field of the data packet to calibrate the identification module.

In some implementations of the present technology, the digital words are selected from 1-bit words, 2-bit-words, 3-bit words and 4-bit words; and the processor of the electric device is further configured to cause the load to vary the power level received at the power input between a number of intensities consistent with a number of bits of the digital words.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 4a, 4b and 4c are a sequence diagram showing operations of a method for identifying a connection between a power distribution unit and an electric device in accordance with an embodiment of the present technology;

Figure 1:
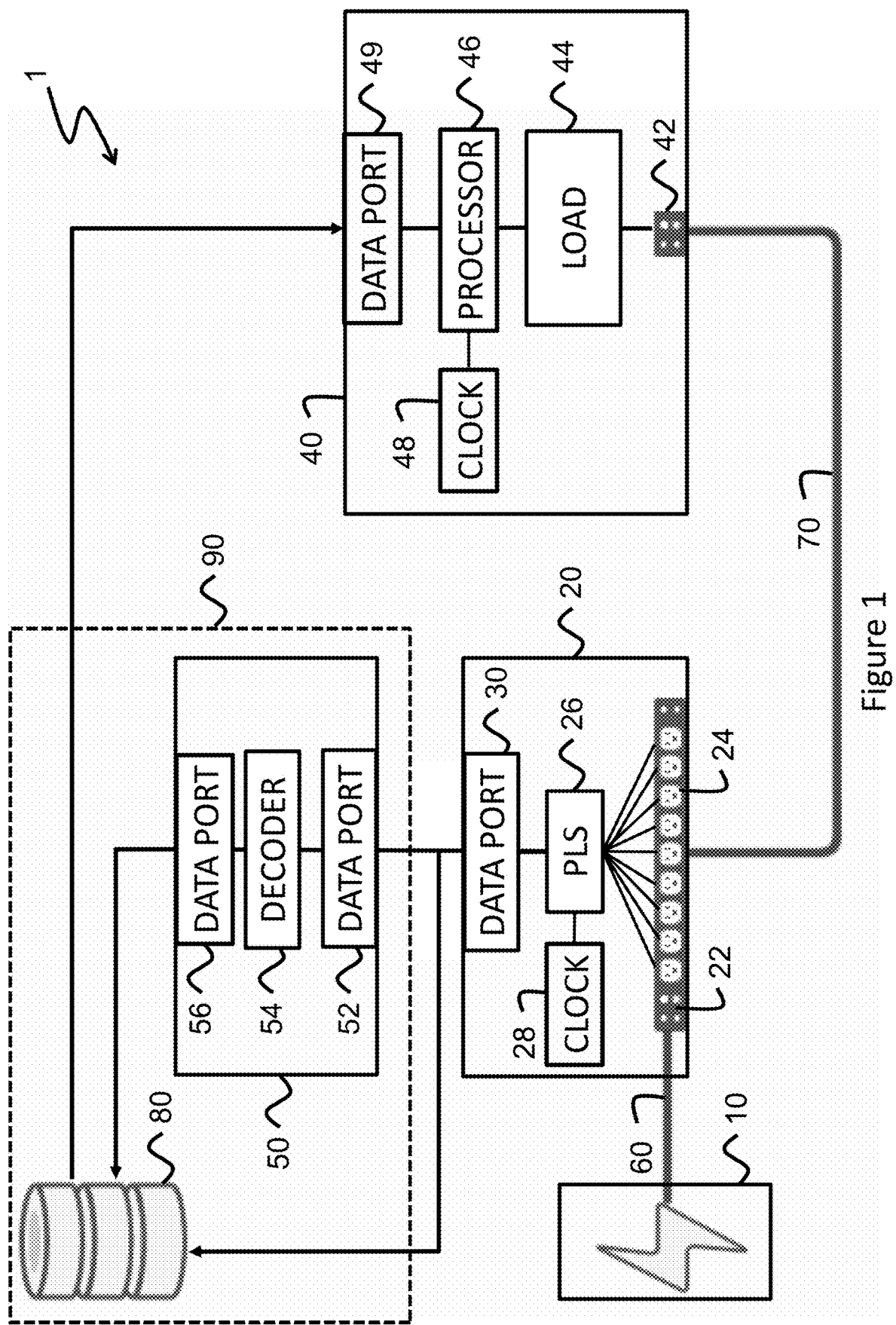
FIG. 1 illustrates a power distribution system in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect, the present technology, an electric device transmits its own identity, via a power line, to a power source, for example to a power distribution unit (PDU). The electric device forms a data packet that contains its identity, and encodes the data packet in digital words. For example and without limitation, the digital words may be single-bit words to encode the data packet in a binary format. Alternatively, the digital words may be 2-bit words, 3-bit words or 4-bit words to encode the data packet in a quad format, an octal format or a hexadecimal format. The number of bits per digital words may be selected, for example and without limitation, on an expected level of electric noise on the power line between the electric device and the PDU. The electric device varies a level the power consumed on the power line between two or more intensities that correspond to two or more logical values, the number of power intensities being consistent with a number of bits of the digital words. An identification module communicatively coupled to the PDU uses the variations of the power level to decode the identity of the electric device. In an embodiment, the data packet is transmitted in this manner by the electric device after receiving a power up trigger or a control signal. Once the transmission of the data packet is completed, the electric device may be operated and consume power at varying levels according to its intended purpose and functions.

With these fundamentals in place, we will now consider some non-limiting examples to illustrate various implementations of aspects of the present technology.

FIG. 1 illustrates a power distribution system 1. The power distribution system 1 comprises a main power source 10, a power distribution unit (PDU) 20, an identification module 50, an electric device 40, power lines 60 and 70, and a database 80. In an embodiment, the database 80 and the identification module 50 may be implemented in a same physical unit. In another embodiment, the identification module 50 may be integrated in the PDU 20. The power distribution system 1 may, for example and without limitation, distribute electric power to a number of electric devices 40, for example servers, of a datacenter. In an embodiment, the identification module 50 and the database 80 may be part of a management function 90 for the datacenter.

FIG. 1 is simplified for illustration purposes. For example, the PDU 20 and the identification module 50 may be directly or indirectly connected, being communicatively coupled via a network (not shown). Likewise, a connection between the identification module 50 and the database 80 or with any part of the management function 90 may be direct or indirect, signaling flowing between these elements via direct lines or via a network. In an embodiment, one identification module 50 may be dedicated to a single PDU 20. In another embodiment, a plurality of PDUs 20 may be operatively connected to a same identification module 50. The present technology does not depend on any physical separation or combination of the PDU 20, the identification module 50 and the database 80.

In the context of the present technology, the PDU 20 may include any device including at least one power input and a plurality of power outputs designed to distribute power to a plurality of loads of any type. In this context, several PDUs may be assembled in various tiers and the electric device 40 may comprise a lower tier PDU receiving power from the PDU 20, which may be a higher tier PDU.

The main power source 10 provides electric power to the PDU 20 via a main power line 60. In turn, the PDU 20 provides electric power to the electric device 40 via the power line 70.

The main power source 10 may for example and without limitation be an uninterruptible power supply (UPS) receiving power from a public power utility. In a typical application, the power distribution system 1 may comprise a plurality of main power sources 10 that each provide electric power to a plurality of PDUs 20. In turn, each PDU 20 may provide electric power to a plurality of electric devices 40. The power distribution system 1 may include hundreds or thousands of PDUs 20 providing power to thousands or tens of thousands of electric devices 40.

Electric power from the main power source 10 is received on an input connector 22 of the PDU 20 via the main power line 60. The PDU 20 comprises a plurality of power output sockets 24. As illustrated, one of the output sockets 24 provides electric power to the electric device 40 via the power line 70. Although the PDU 20 is illustrated in the form of a power bar on FIG. 1, the PDU 20 may have other shapes or form factors. The PDU 20 may comprise a plurality of input connectors 22. A number of output sockets 24 is related to an overall power rating of the PDU 20 and to the expected power consumption of the various electric devices connected thereto. There is thus no a priori limit to the number of output sockets 24 of the PDU 20.

The PDU 20 comprises a power level sensor (PLS) 26 that senses a level of power output at each given output socket 24 upon cycles defined by a clock 28. It is contemplated that the PDU 20 may comprise a plurality of PLSs 26, for example one PLS 26 being dedicated to each output socket 24. Considering the output socket 24 connected to the electric device 40 via the power line 70, the PDU 20 reports, via a data port 30 connected to the identification module 50, successive power level data, along with a number of the output socket 24.

The identification module 50 includes a first data port 52 receiving the reported information from the data port 30 of the PDU 20, a decoder 54, and a second data port 56 arranged to forward, to the database 80, a reference between an identity of the electric device 40, an identity of the PDU 20 and a socket number for the output socket 24 connected to the electric device 40.

In one embodiment, the identification module 50 may be integrated in the PDU 20. In that embodiment, the identity of the PDU 20 is a priori known by configuration information stored in the identification module 50. In another embodiment, there is a one-to-one correspondence between the PDU 20 and the identification module 50 and the identity of the PDU 20 may also be known by configuration information stored in the identification module 50. In a further embodiment, the data port 52 of the identification module 50 may include a plurality of distinct connections, one connection being dedicated to one PDU 20. In that embodiment, the identification module 50 may rely on configuration information to obtain the identity of the PDU 20 based on the dedicated connection in the data port 52. In yet another embodiment, the PDU 20 may transmit its own identity to the identification module 50, along with the successive power level data and the number of the output socket 24, this information being transmitted by the data port 30 of the PDU 20 and received at the data port 52 of the identification module 50. In various embodiments, the data port 30 of the PDU 20 and the data port 52 of the identification module may communicate using a power line communication (PLC) protocol. In any case, the relationship between the PDU 20 and the identification module 50 as illustrated on FIG. 1 allows making the identification module 50 aware of the power level being delivered to each electric device 40 via the various output sockets 24 for purposes of identifying the connections between the output sockets 24 and the electric devices 40.

The electric device 40 may for example and without limitation be a computer, a server and like electronic devices, or other equipment such as fans, water cooling pumps, and the like. The electric device 40 comprises a power input 42 for receiving electric power from the PDU 20 via the power line 70. The electric device 40 also comprises a load 44, a processor 46, a clock 48 and a data port 49. The electric device 40 is simplified for ease of illustration. The load 44 may comprise a plurality of components related to the functions provided by the electric device 40, for example and without limitation a memory, one or more memory discs, one or more graphical processing units (GPU), one or more busses, one or more cooling fans, and the like. The processor 46 may be part of the load 44, and the load 44 may comprise one or more additional processors. In the context of the present technology, the load 44 may be understood as a single entity that may consume variable amounts of electric power depending on operational conditions of the electric device 40. The clock 48 may be an actual circuit (e.g. a chip) implemented in the electric device 40. Alternatively, the clock 48 may be realized as a software function of the processor 46.

Figure 2:
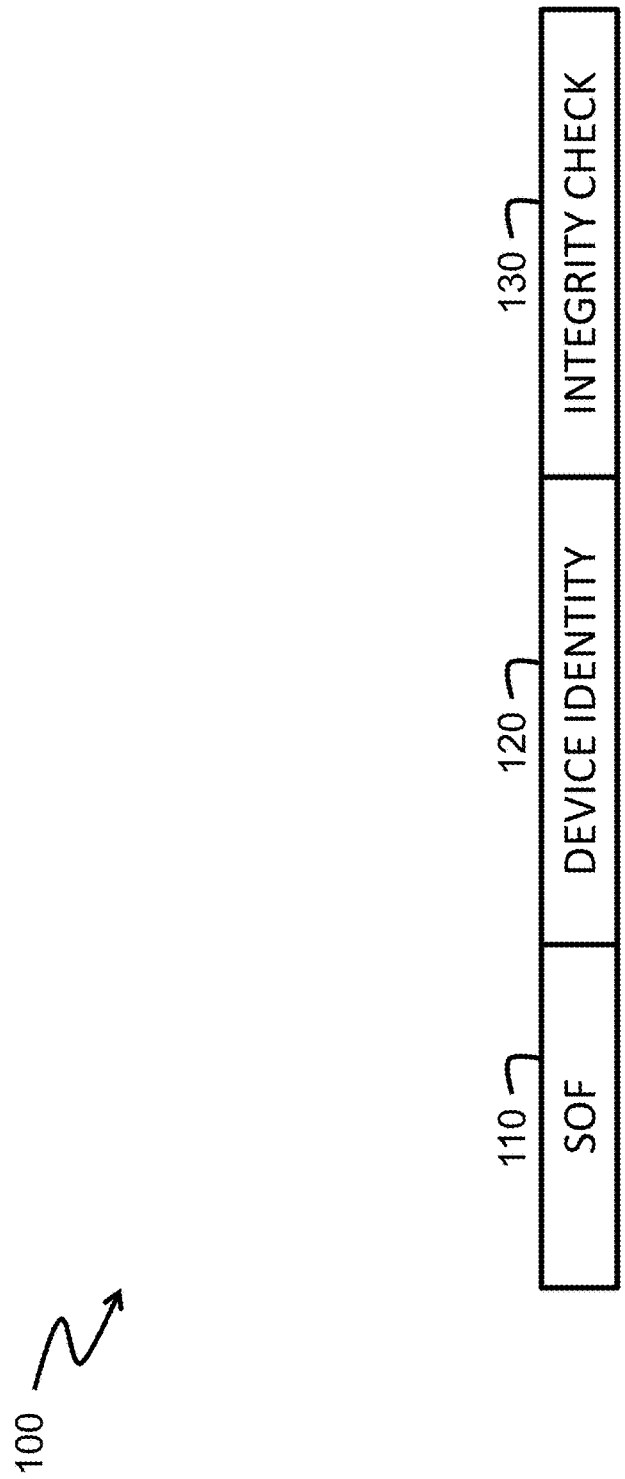
FIG. 2 illustrates a data packet in accordance with an embodiment of the present technology.

The present technology allows storing, in the database 80, a smart grid registry forming a set of references between identities of the electric devices 40, identities of corresponding PDUs 20 and socket numbers for corresponding output sockets 24. To this end, the processor 46 may form a data packet for transmitting the identity of the electric device 40 to the PDU 20. FIG. 2 illustrates a data packet 100. The data packet 100 comprises a start of frame (SOF) field 110 followed by a field 120 containing the identity of the electric device 40. The identity of the electric device 40 is encoded in digital words. In a non-limiting embodiment, the identity of the electric device 40 may be encoded in binary format, each digital word comprising a single bit. In other non-limiting embodiments, the identity of the electric device may be encoded in a quad format, an octal format, or a hexadecimal format, each digital word including 2, 3 or 4 bits. It is contemplated that the identity of the electric device 40 may alternatively comprise a number of digits encoded in American Standard Code for Information Interchange (ASCII) so that each digit is encoded using 8 bits. For illustration purposes and without limiting the generality of the present technology, the following examples will be described mainly in the context of binary encoding of the data packet 100, each digital word comprising a single bit.

The number of digits in the field 120 may vary according to the needs of a particular application. For example and without limitation, five digits suffice to define unique identities for tens of thousands of servers in a large datacenter. In an embodiment, the identity of the electric device 40 may be stored permanently or semi-permanently in a memory (not shown) of the electric device 40. In another non-limiting example, the unique identity of a server may also be defined using its media access control (MAC) address or another device-specific identity. In another embodiment, the identity may be received at the data port 49 from an external source, for example from the database 80 of the management function 90, for storage in the memory.

As illustrated on FIG. 2, the data packet 100 may also include an integrity check field 130, for example a checksum calculated on the basis of the identity of the electric device 40 and, optionally, further on the basis of other data fields (not shown) of the data packet 100. The processor 46 encodes the data packet 100 in binary form, thereby forming a series of logical zeroes and ones or, equivalently, a series of logical opposite values of a binary coding system. The processor 46 assembles the logical zeroes and ones to form digital words, each digital word including one or more bits. The processor 46 causes transmitting the data packet 100 to the identification module 50 via the PDU 20 by varying a power level on a power line 70 that connects the electric device 40 to the PDU 20. In a non-limiting example, the digital words are single-bit words and the power level is varied between a first intensity for transmitting first logical values of the digital words, for example logical zeroes, and a second intensity for transmitting second logical values of the digital words, for example logical ones. For example and without limitation, the first intensity may be greater than the second intensity and be obtained when the processor 46 causes the load 44 to execute power hungry tasks. The second intensity may be obtained when the processor 46 causes turning off the power hungry tasks in the load 44. The first intensity may represent logical ones and the second intensity may represent logical zeroes. An opposite encoding of logical zeroes and ones is also contemplated. In another example, one of the first and power levels may be set substantially to zero (i.e. 0 watt) and the other power level may be set to a nonzero level. If higher order encoding is used, for example if a quad, octal or hexadecimal format is used, the processor 46 may cause the load 44 to vary the power between a plurality of distinct power levels, the number of power levels being consistent with the number of bits of each digital word.

Figure 3:
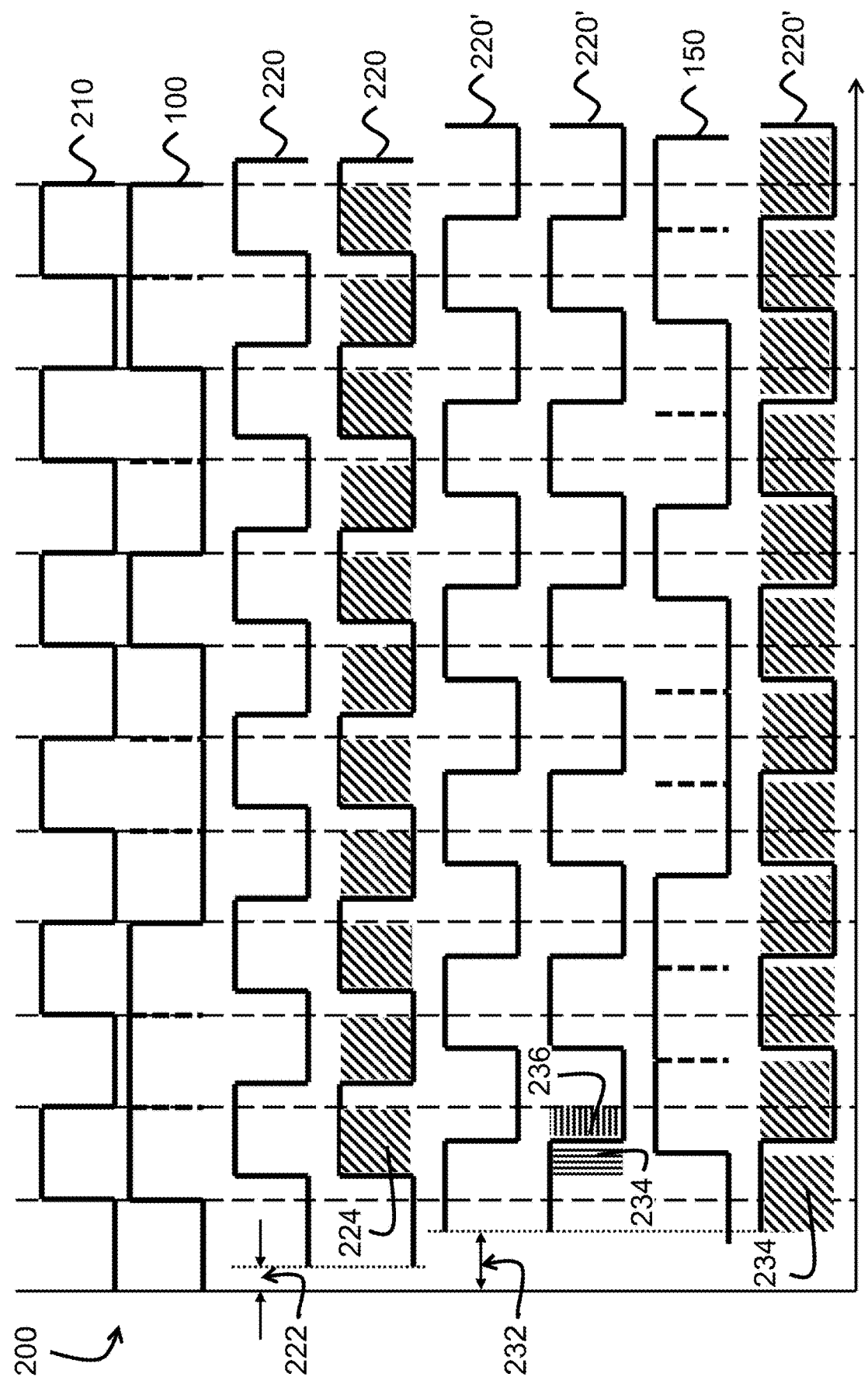
FIG. 3 is a timing diagram showing alternating phases of clock sequences generated in the electric device and in the power distribution unit and showing a portion of the data packet in accordance with an embodiment of the present technology.

In an embodiment, the processor 46 may synchronize the variations of the power level on the power line 70 with an internally generated clock sequence. FIG. 3 is a timing diagram 200 showing alternating phases of clock sequences generated in the electric device 40 and in the PDU 20 and showing a portion of the data packet 100. The processor 46 aggregates a plurality of rapid phases of the clock 48 to generate a clock sequence 210 defining alternating phases at a predetermined clock rate. The data packet 100 (only a portion thereof being shown on FIG. 3), which is encoded in binary format in this example, is generated under control of the processor 46 so that a timing of its successive logical values is aligned with the alternating phases of the clock sequence 210. This predetermined clock rate may have a relatively slow duty cycle so that, for example, a single bit (i.e. one logical value) of the data packet 100 is sent every few seconds, for example once every five seconds, to facilitate decoding of the data packet 100 at the identification module 50. Faster or slower rates are also contemplated. In a non-limiting embodiment, the SOF field 110 may occupy 1 byte, the field 120 that contains the device identity may occupy 3 bytes, and the integrity check field 130 may occupy 1 byte. In this embodiment, the data packet 100 occupies 5 bytes, i.e. 40 binary values. The 3 bytes of the field 120 are sufficient for 16 million distinct device identities. For example, if the clock rate of the clock sequence 210 is such that one logical value is sent every five seconds, the data packet may be transmitted once over a period of 200 seconds.

Although successive logical values of the data packet 100 are illustrated on FIG. 3 as clearly distinct high and low values, the logical values are in fact generated when the processor 46 causes the load 44 to turn on and off power hungry tasks or, alternatively, when the processor 46 causes the load 44 to alternate between heavy and light tasks, at each successive phase of the clock sequence 210. In a practical realization, some parts of the load 44 may include and/or use switched-mode power supplies (not shown) or other non-linear devices (not shown) and, as a result, the level of the power consumption may vary at a much faster rate than the rate of the clock sequence 210. In another practical realization, some parts of the load 44 may include motors (e.g. a fan) causing the load 44 to be at least in part reactive, slowing down changes in the level of the power consumption. Therefore, the high and low values of the data packet 100 as shown on FIG. 3 represent an aggregation (e.g. averages or root mean square values) of the power that is actually consumed over each phase of the clock sequence 210.

The data packet 100 is intended to be detected by the identification module 50, which is operatively connected to the PDU 20. A clock 28 of the PDU 20 is also used to generate a clock sequence defining alternating phases. The clock sequence of the PDU 20 is referenced at 220 and 220' in two distinct scenarios on FIG. 3, reference 220' indicating a shift by one half of a phase (or a quarter of a period) of the clock sequence 220. The clock sequence 220 also defines its alternating phases at a predetermined clock rate. The clock rates of the clock sequence 210 generated by the electric device 40 and of the clock sequence 220 generated by the PDU 20 are designed to be nominally equal. However, these clock sequences are not synchronized and may be out of phase in relation to one another. In practice, the electric device 40 may initialize the clock sequence 210 upon power up or restart, without knowledge of the current timing (220 or 220') of the clock sequence 220 of the PDU 20. This asynchrony might prevent proper detection of the data packet 100 at the PDU 20 and proper decoding of the data packet at the identification module 50.

As illustrated on FIG. 3, in a first scenario, there may be a moderate shift 222 between the alternating phases of the clock sequence 210 of the electric device 40 and alternating phases of the clock sequence 220 of the PDU 20. In this scenario, there is still a broad portion 224 of each alternating phase of the clock sequence 220 that are aligned with a timing of the logical values of the data packet 100, allowing the decoder 54 of the identification module 50 to clearly identify each logical value of the data packet 100. It may be observed that the decoder 54 would still be able to identify the logical values of the data packet 100 in case where a delay corresponding to one phase of the clock sequence 220 was added to the shift 222; this is because it is the time gap between each ascending and descending edges of the alternating phases of the clock sequence 220 that define instants when the decoder 54 may succeed in identifying the logical values, this time gap being the same whether the clock sequence 220 is in a high or low phase.

As illustrated, in a second scenario, there is an important shift 232 between the alternating phases of the clock sequence 210 of the electric device 40 and alternating phases of the clock sequence 220' of the PDU 20. In this scenario, only small portions 234 and 236 of each alternating phase of the clock sequence 220' are aligned with the timing of the logical values of the data packet 100. The decoder 54 of the identification module 50 might fail to properly decode the logical values of the data packet 100 in this scenario.

In order to increase the likelihood of detection of the data packet 100 at the identification module 50, the processor 46 may cause the data packet 100 to be transmitted twice. Once the first transmission of the data packet 100 is completed, its logical values being aligned with the timing of the alternating phases of the clock sequence 210, the processor 46 may cause a retransmission 150 of the data packet, logical values contained in the retransmission 150 of the data packet being now shifted from the alternating phases of the clock sequence 210 of the electric device 40 by one half of a phase of the clock sequence 210. There are now broad portions 234 of the alternating phases of the clock sequence 220' of the PDU 20 that are aligned with the timing of the logical values of the data packet of the retransmission 150, and the decoder 54 of the identification module 50 is expected to clearly identify each logical value in the retransmission 150 of the data packet.

In the PDU 20, the PLS 26 senses values of the power used by the electric device 40 on the power line 70 at each cycle defined by the clock 28. These values may be sensed at a rapid pace sufficient to detect the rapid variations of the power level on the power line 70. The PDU 20 generates the clock sequence 220 by aggregating a plurality of rapid phases of the clock 28, a clock rate of the clock sequence 220 being nominally equal to the clock rate of the clock sequence 210 generated by the electric device 40. It will be noted that the PDU 20 is unaware of any phase difference between this clock sequence 220 and the clock sequence 210 of the device 40. The PDU 20 also aggregates the sensed power levels obtained over each phase of the clock sequence 220, for example by calculating an average or a root mean square of the sensed power levels, to produce successive power level data at successive phases of the clock sequence 220.

The PDU 20 reports the power usage of the electric device 40 to the identification module 50. These reports comprise successive power level data obtained on the power line 70 and a socket number of the output socket 24 delivering power to that electric device 40 on the power line 70. An identity of the PDU 20 may also be included in the reports. Table I provides a non-limiting example of information provided by the PDU 20 to the identification module 50, the digital words being 1-bit words in this example.

TABLE I

| Period | PDU ID | Socket Number | Power Level Data |
|---|---|---|---|
| 1 | 1 | 1 | 10 |
| 1 | 1 | 2 | 100 |
| 1 | 1 | 3 | 100 |
| 2 | 1 | 1 | 8 |
| 2 | 1 | 2 | 12 |
| 2 | 1 | 3 | 100 |
| 3 | 1 | 1 | 100 |
| 3 | 1 | 2 | 15 |
| 3 | 1 | 3 | 100 |
| 4 | 1 | 1 | 100 |
| 4 | 1 | 2 | 11 |
| 4 | 1 | 3 | 9 |

In the example of Table I, each period corresponds to one of the successive phases of the clock sequence 220. A single PDU (PDU ID=1) reports power data for its three sockets (socket numbers 1, 2 and 3) over a four successive periods (periods 1, 2, 3 and 4). For the first socket (socket number=1), the successive power data is equal to 10, 8, 100 and 100 watts, that the identification module 50 interprets as indicating that a corresponding portion of the data packet 100 over the four successive periods contains the logical values (0,0,1,1). For the second socket (socket number=2), the successive power data is equal to 100, 12, 15 and 11 watts, that the identification module 50 interprets as indicating that a corresponding portion of the data packet 100 over the four successive periods contains the logical values (1,0,0,0). For the third socket (socket number=3), the successive power data is equal to 100, 100, 100 and 9 watts, that the identification module 50 interprets as indicating that a corresponding portion of the data packet 100 over the four successive periods contains the logical values (1,1,1,0).

While in the above example low power values correspond to logical zeros and high power values correspond to logical ones, an opposite implementation in which lower power values would correspond to logical ones and high power values would correspond to logical zeroes is also contemplated. The identification module 50 may implement a threshold, for example and without limitation 50 watts, for determining whether a low or high power value is identified in each power level data. Several thresholds may be used by the identification module 50 to distinguish between power values of digital words having more than one bit per word.

In the example of Table I, any power level exceeding 100 watts is reported as being equal to 100 watts for simplicity. In a practical realization, a plurality of PDUs 20 may provide reports to the identification module 50, each PDU 20 having its own PDU ID. Each PDU 20 may comprise more than the three sockets mentioned in Table I. Reports related to receiving the data packet 100, or its retransmission 150, may extend over 40 periods in the non-limiting example in which the data packet 100 extends over 5 bytes. Table I is therefore highly simplified for illustration purposes.

In case of strong phase shift between the clock sequences 210 and 220 (as illustrated with references 210 and 220' on FIG. 3), the identification module 50 may fail to relate the power level data reported by the PDU 20 to the desired logical values. For example, many entries in the Power Level Data column of Table I may at once be significantly higher than 30 watts and lower than 70 watts (with comparison with the values of Table I in this example), rendering uncertain the determination by the identification module 50 that a logical 0 or a logical 1 is intended to be represented. In such cases, the data packet 100 may be unreadable by the identification module 50. If the device 40 retransmits the data packet 100 with a phase shift as shown on FIG. 3 (retransmission 150), the power level data obtained from sensed values of the power used by the electric device 40 on the power line 70 in the course of the retransmission 150 is expected to clearly relate to the desired logical values.

In the identification module 50, the decoder 54 may detect that variations of the reported power level data provide an initial indication that a data packet 100 is being received at the output socket 24. In an embodiment, this initial indication may be confirmed at the decoder 54 by detecting the SOF field 110. In this embodiment, the decoder 54 may be calibrated using the successive power level data. To this end, the identification module 50 may track variations of the successive power level data in the SOF field 110 to identify which power level corresponds to the first logical value and which power level corresponds to the second logical value. For example, the decoder 54 may observe that the power level is maintained at a high value at a time when the SOF field 110 is expected to contain a logical 1. The decoder 54 may then observe that the power level is maintained at a low value at a time when the SOF field 110 is expected to contain a logical 0. The decoder 54 may then be calibrated to consider successive power level data and to interpret each of these data as a logical 1 or a logical 0 based on comparisons between the successive power level data and the high and low values. If higher order encoding is used, for example if a quad, octal or hexadecimal format is used, the decoder 54 may detect a plurality of distinct power levels, the number of power levels being consistent with the number of bits per digital word. In embodiments using higher order encoding, the decoder 54 may calibrate a plurality of thresholds for distinguishing between values of the digital words.

The decoder 54 then decodes the identity of the electric device 40 in the field 120. The decoder 54 may also decode the integrity check field 130, if included in the data packet 100. The decoder 54 may use the integrity check field 130, if present, to verify that the identity of the electric device 40 is properly decoded.

Once the identification module 50 has properly decoded the identity of the electric device 40, this identity, the identity of the PDU 20 and the socket number of the output socket 24 are sent via the data port 56 to the database 80 for storage of a reference between the identity of the electric device 40, the identity of the PDU 20 and the socket number in the smart grid registry.

Transmission of the data packet 100 from the electric device 40 to the identification module 50 via the PDU 20 thus allows the identification module 50 to discover the identity of the electric device 40 connected via the power line 70 to PDU 20 and to the output socket 24. This operation may be performed, for example, when the electric device 40 is initially powered on following the connection of the power line 70 to the power input 42, or when the connection to the power input 42 is changed, or upon receiving a command signal (not shown) at the data port 49 of the electric device 40. At the time, for a brief moment, functional features of the electric device 40 may not yet be operational and the processor 46 may control the load 44 to execute tasks for the purposes of encoding the data packet 100. The power level on the power line 70 is varied for purposes of sending the data packet 100 for a short period. Thereafter, the functional features of the electric device 40 are used according to their intended purpose.

Figure 4A:
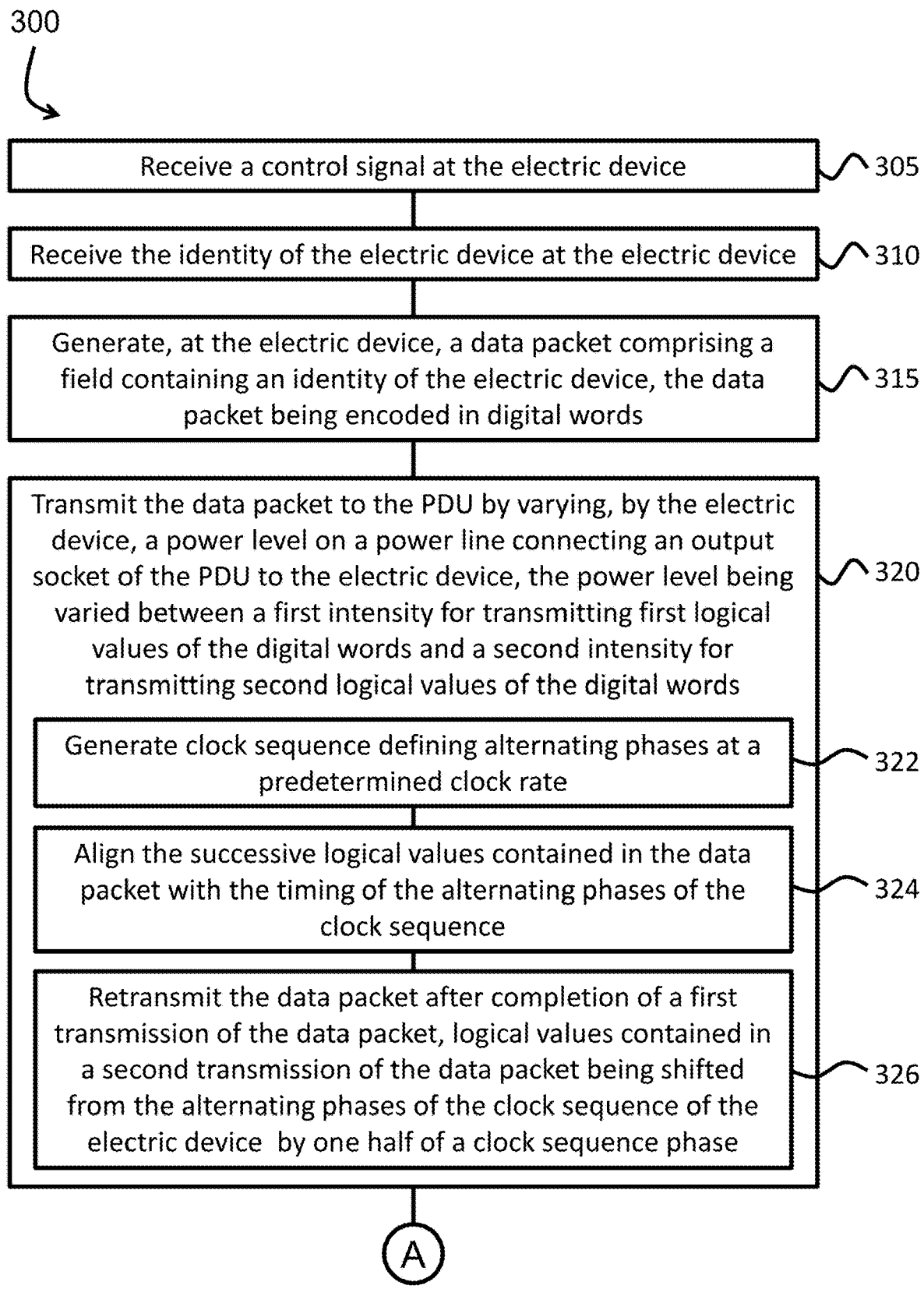
Figure 4B:
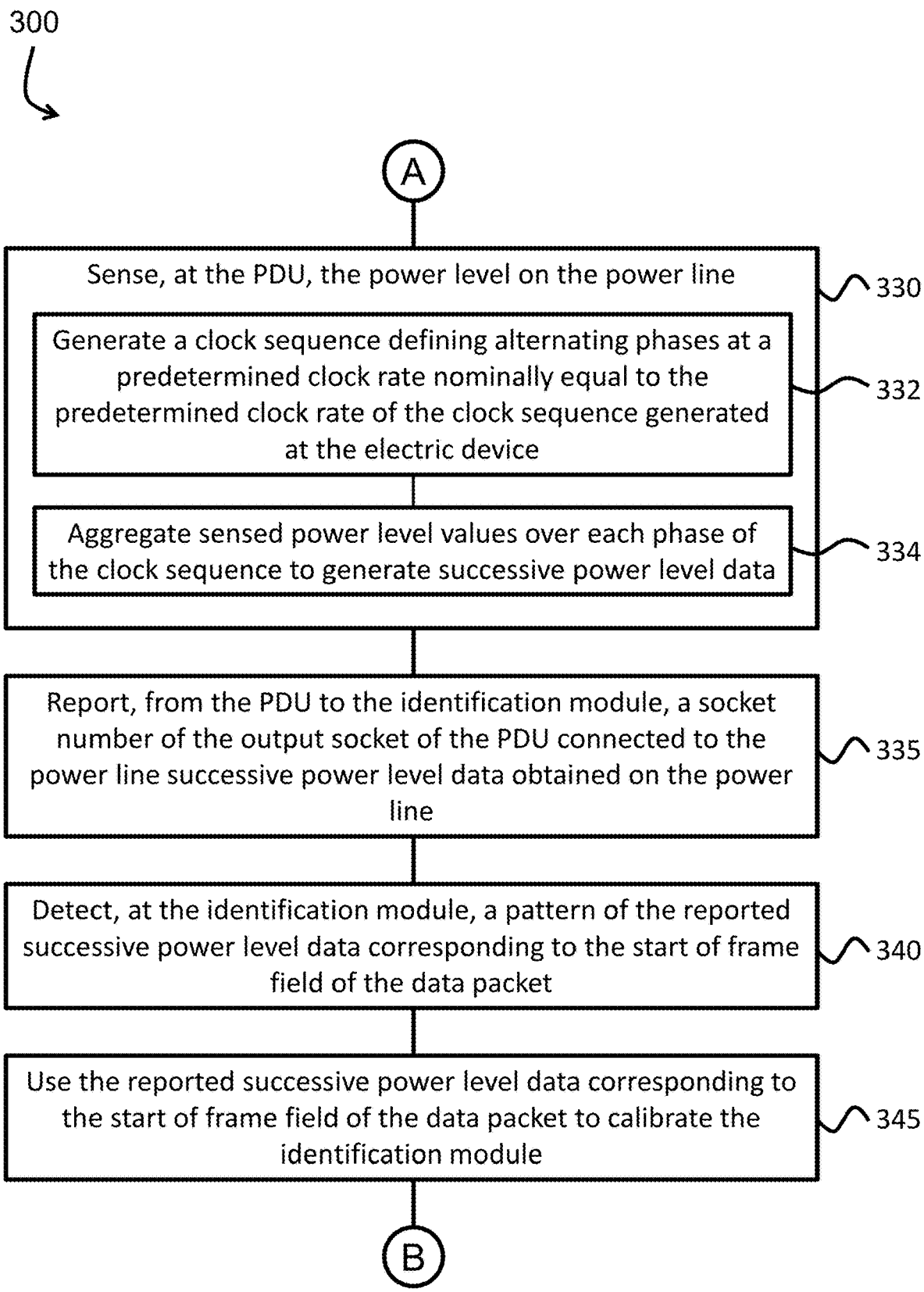

FIGS. 4a, 4b and 4c are a sequence diagram showing operations of a method for identifying a connection between the PDU 20 and the electric device 40. A sequence 300 comprises a plurality of operations, some of which may be executed in variable order, some of the operations possibly being executed concurrently, some of the operations being optional. The sequence 300 is initiated at operation 305 (FIG. 4a), when the processor 46 of the electric device 40 receives a control signal. This control signal may be a power up trigger resulting from an operator having depressed a power up switch on the electric device 40, or resulting from an application of power on the power input 42. Alternatively, the control signal may be received from an external source at the data port 49 of the electric device 40, for example and without limitation from the management function 90. At operation 310, the identity may be received at the data port 49, for example from the management function 90. Alternatively, the identity of the electric device 40 may be permanent or semi-permanently stored in a non-transitory memory of the electric device 40.

At operation 315, the electric device generates the data packet 100, which comprises at least the field 120 containing the identity of the electric device 40, the data packet 100 being encoded in digital words, for example single-bit words for a binary format, 2-bit words for a quad format, 3-bit words for an octal format, or 4-bit words for a hexadecimal format. As illustrated on FIG. 2, the data packet 100 may further comprises the SOF field 110 preceding the field 120 that contains the identity of the electric device 40, and may also comprise the integrity check field 130, which is calculated based at least in part on the identity of the electric device 40. The electric device 40 transmits the data packet 100 to the PDU 20, at operation 320, by varying a power level on the power line 70 that connects an output socket 24 of the PDU 20 to the electric device 40. To this end, the power level is varied between a first intensity for transmitting first logical values of the digital words and a second intensity for transmitting second logical values of the digital words. For example and without limitation, the first logical values may be logical ones expressed by a high intensity of the power level, and the second logical values may be logical values expressed by a low intensity of the power level. An opposite encoding of the first and logical values is also contemplated. The power level on the power line 70 may be varied between a plurality of intensities digital words having more than one bit per word are used.

In an embodiment, operation 320 may comprise one or more sub-operations 322, 324 and 326. At sub-operation 322, the electric device 40 generates the clock sequence 210 that defines alternating phases at a predetermined clock rate. A sub-operation 324, the electric device aligns a timing of the successive logical values contained in the data packet 100 with the alternating phases of the clock sequence 210. At sub-operation 326, the electric device 100 may also retransmit the data packet 100 after completion of a first transmission of the data packet 100. Logical values contained in the retransmission 150 of the data packet 100, at sub-operation 326, are shifted from the alternating phases of the clock sequence 210 of the electric device 40 by one half of a phase of the clock sequence 210.

Continuing on FIG. 4b, the PDU 20 senses the power level on the power line 70 at operation 330 to provide power level data for the identification module 50. It is observed that the power level on the power line 70 is also a power level on the output socket 24 that provides power to the electric device 40.

In an embodiment, operation 330 may comprise one or more sub-operations 332 and 334. At sub-operation 322, the PDU 20 generates the clock sequence 220 that defines alternating phases at a predetermined clock rate nominally equal to the predetermined clock rate of the clock sequence 210 generated at the electric device 40. Then at sub-operation 324, the PDU 20 aggregates sensed power level values over each phase of the clock sequence 220 to generate successive power level data.

The PDU 20 reports the socket number of the output socket 24 connected to the power line 70 and successive power level data obtained on the power line 70 to the identification module 50 at operation 335. The PDU 20 may also report its own identity to the identification module 50, in order to distinguish between a plurality of PDUs 20 in communication with the same identification module 50. At operation 340, the identification module 50 may detect a pattern of the reported successive power level data corresponding to the SOF 110 of the data packet 100. The identification module 50 may use the reported successive power level data corresponding to the SOF 110 of the data packet for calibration purposes at operation 345.

Continuing on FIG. 4c, at operation 350, the identification module 50 decodes the identity of the electric device 40 by monitoring the successive power level data reported by the PDU 20. In an embodiment, operation 350 may comprise one or more sub-operations 352 and 354.

At sub-operation 352, the identification module 50 may decode the integrity check field 130, if present in the data packet 100 or in its retransmission 150. Then at sub-operation 354, the identification module may verify an integrity of the decoded identity of the electric device 40 based on the integrity check field 130. If the verification made at sub-operation 354 fails, the identity of the electric device 40 has not been properly decoded and the sequence 300 ends without storing information in the database 80.

Following a proper decoding of the identity of the electric device 40 at operation 350, the sequence 300 ends with operation 360, which comprises storing, in the database 80, a reference between the identity of the electric device 40, the identity of the PDU 20 and the socket number of the output socket 24 connected to the electric device 40 via the power line 70.

Figure 5:
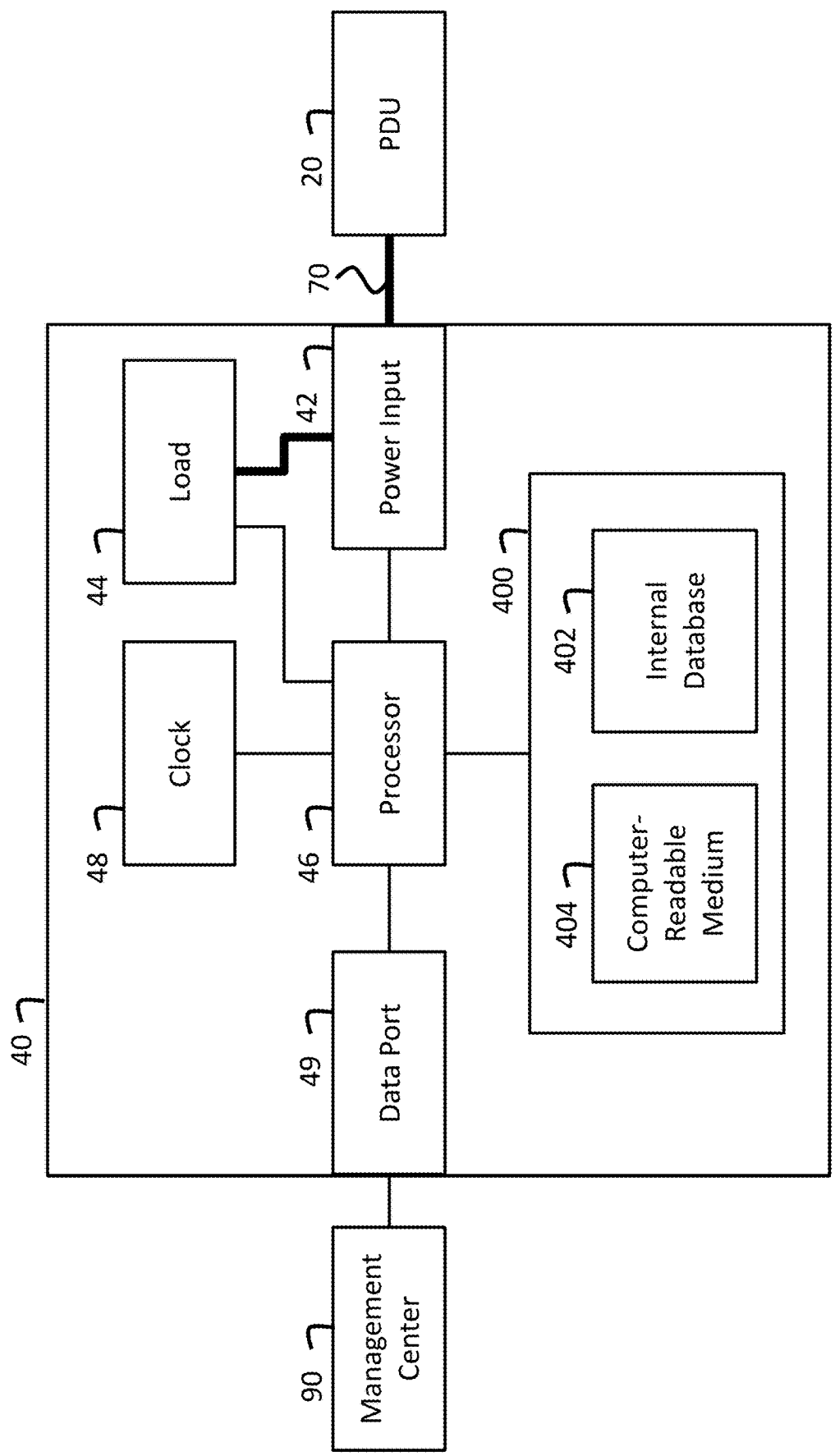
FIG. 5 is a block diagram of an electric device in accordance with an embodiment of the present technology.

Each of the operations performed by the electric device 40 in the sequence 300 may be configured to be processed by one or more processors, the one or more processors being coupled to a memory device. For example, FIG. 5 is a block diagram of a non-limiting example of the electric device 40. On FIG. 5, the electric device 40 includes a processor or a plurality of cooperating processors (represented as a processor 46 for simplicity), a memory device or a plurality of memory devices (represented as a memory device 400 for simplicity), an input/output device a plurality of input/output devices (represented as a data port 49). The data port 49 may comprise an input and an output implemented as separate devices and may be configured to communicate, directly or via a network (not shown), with external devices and nodes, for example with the database 80 or with other components (not shown) of the management center 90. As mentioned in the description of FIG. 1, the electric device 40 also comprises a power input 42, a load 44 and the clock 48. The processor 46 is operatively connected to the memory device 400, to the data port 49, to the power input 42, to the clock 48 and to the load 44. As previously noted, the clock 48 may alternatively be implemented as a software function of the processor 46. The memory device 400 contains an internal database 402 for storing parameters related to the operation of the electric device 40, one of these parameters being the identity of the electric device 40, another of these parameters being the clock rate of the clock sequence 210. The memory device 400 may comprise a non-transitory computer-readable medium 404 for storing instructions that are executable by the processor 46 to perform the operations of the electric device in the sequence 300 and to perform other functions supported by the electric device 40.

As expressed hereinabove, when the processor 46 receives a trigger command, from the management center 90, from a power on switch (not shown) or simply by the connection of the power line 70 on the power input 42, the processor 46 causes the load 44 to vary its power consumption between two or more distinct power levels to two or more distinct intensities in order to form the data packet 100, for detection at the identification module 50.

Figure 6:
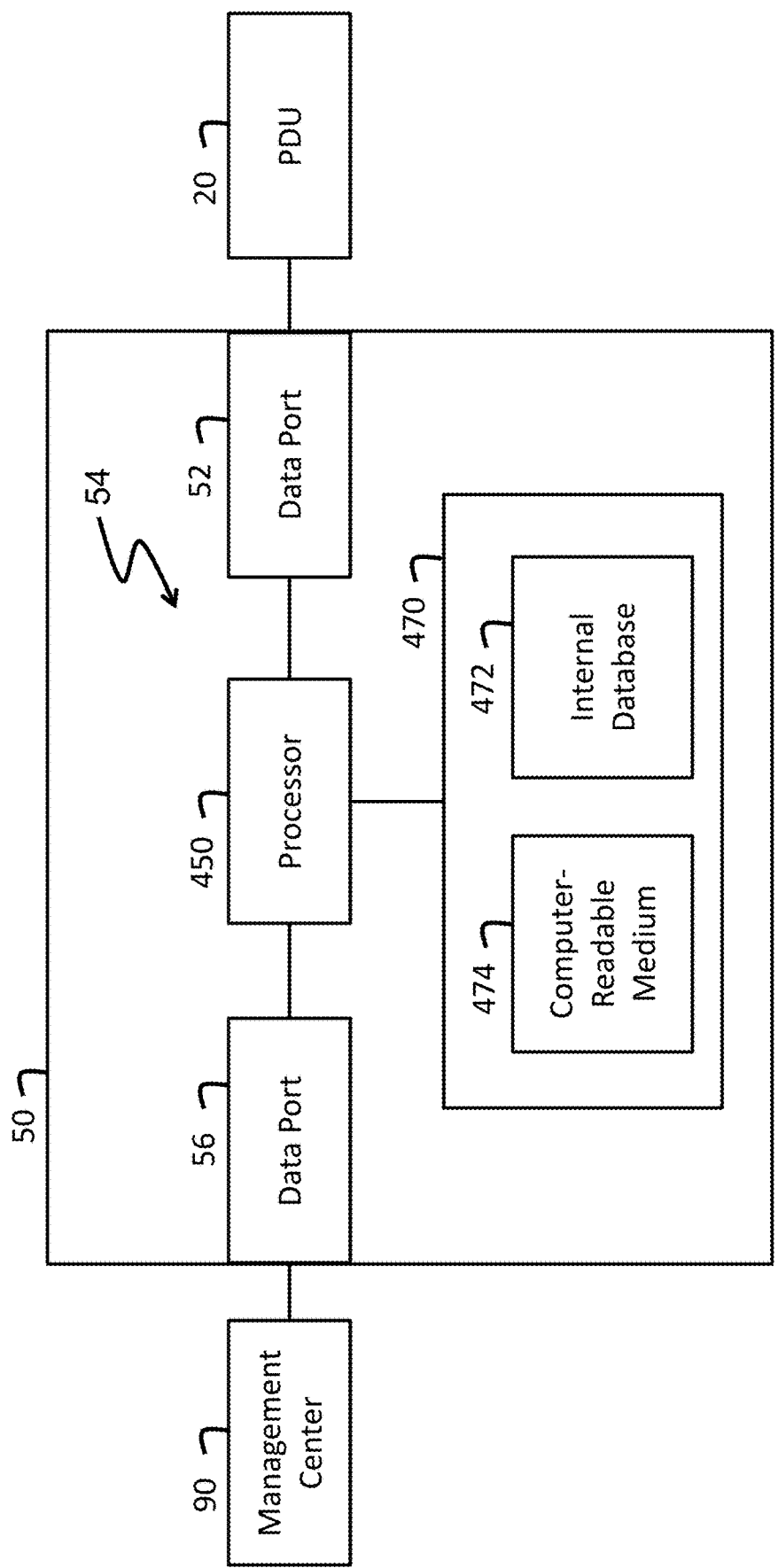
FIG. 6 is a block diagram of an identification module in accordance with an embodiment of the present technology.

Similarly, each of the operations performed by the identification module 50 in the sequence 300 may be configured to be processed by one or more processors, the one or more processors being coupled to a memory device. For example, FIG. 6 is a block diagram of the identification module 50. On FIG. 6, the identification module 50 includes the decoder 54 and the data ports 52 and 56 that respectively communicate with the PDU 20 and with the management center 90 (including the database 80), as described hereinabove. In turn, the decoder 54 includes a processor or a plurality of cooperating processors (represented as a processor 450 for simplicity) and a memory device or a plurality of memory devices (represented as a memory device 470 for simplicity). The processor 450 is operatively connected to the memory device 470 and to the data ports 52 and 56. The data ports 52 and 56 may each include an input and an output implemented as separate devices and may each be configured to communicate with external devices and nodes, either directly or via a network (not shown). The memory device 470 contains an internal database 472 for storing parameters related to the operation of the identification device 50, for example calibration results obtained from decoding of the SOF field 110 and/or thresholds used for distinguishing between values of the digital words. The memory device 470 may comprise a non-transitory computer-readable medium 474 for storing instructions that are executable by the processor 450 for receiving information from the PDU 20 via the data port 52, for decoding the identity of the electric device 40, and for causing the data port 52 to send the reference between the identity of the electric device 40, the identity of the PDU 20 and the socket number of the socket 24 to the database 80 of the management center 90.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for identifying a connection between a power distribution unit (PDU) and an electric device, the method comprising:
   generating, at the electric device, a data packet comprising a field containing an identity of the electric device, the data packet being encoded in digital words;
   transmitting the data packet to the PDU by varying, by the electric device, a power level on a power line connecting an output socket of the PDU to the electric device, the power level being varied between a first intensity for transmitting first logical values of the digital words and a second intensity for transmitting second logical values of the digital words;
   sensing, at the PDU, the power level on the power line;
   reporting, from the PDU to an identification module, a socket number of the output socket of the PDU connected to the power line and successive power level data obtained by sensing the power level on the power line;
   decoding, at the identification module, the identity of the electric device by monitoring the successive power level data reported by the PDU; and
   selectively storing, in a database, a reference between the identity of the electric device, an identity of the PDU and the socket number.

2. The method of claim 1, wherein:
   the data packet further comprises a start of frame field preceding the field containing the identity of the electric device; and
   the method further comprises detecting, at the identification module, a pattern of the reported successive power level data corresponding to the start of frame field of the data packet.

3. The method of claim 2, further comprising using the reported successive power level data corresponding to the start of frame field of the data packet to calibrate the identification module.

4. The method of claim 1, wherein:
   the data packet further comprises an integrity check field calculated based on the identity of the electric device;
   the method further comprises:
      decoding, at the identification module, an integrity check field within the data packet, and
      verifying, at the identification module, an integrity of the decoded identity of the electric device based on the integrity check field; and
   wherein storing in the database the reference between the identity of the electric device, the identity of the PDU and the socket number is conditional to a successful verification of the integrity of the decoded identity of the electric device.

5. The method of claim 1, wherein reporting, from the PDU to the identification module, the socket number and the successive power level data further comprises reporting the identity of the PDU.

6. The method of claim 1, further comprising receiving a power up trigger at the electric device, wherein the data packet is generated in response to receiving the power up trigger.

7. The method of claim 6, further comprising receiving, at the electric device, the identity of the electric device before transmitting the data packet.

8. The method of claim 1, wherein:
   the identity of the electric device is stored in a non-transitory memory of the electric device; and
   the data packet is generated at the electric device in response to receiving a control signal.

9. The method of claim 1, further comprising:
   generating, at the electric device, a first clock sequence defining alternating phases at a first predetermined clock rate;
   wherein generating the data packet comprises aligning a timing of successive logical values contained in the data packet with the alternating phases of the first clock sequence.

10. The method of claim 9, further comprising:
    generating, at the PDU, a second clock sequence defining alternating phases at a second predetermined clock rate nominally equal to the first predetermined clock rate of the first clock sequence generated at the electric device; and
    aggregating, at the PDU, the sensed power levels obtained over each phase of the second clock sequence to produce the successive power level data at successive phases of the second clock sequence.

11. The method of claim 9, further comprising retransmitting, by the electric device, the data packet after completion of a first transmission of the data packet, logical values contained in a retransmission of the data packet being shifted from the alternating phases of the first clock sequence of the electric device by one half of a phase of the first clock sequence.

12. The method of claim 1, wherein:
    the digital words are selected from 1-bit words, 2-bit-words, 3-bit words and 4-bit words; and
    transmitting the data packet to the PDU comprises varying the power level on the power line between a number of intensities consistent with a number of bits of the digital words.

13. A power distribution system, comprising:
    a database;
    a plurality of electric devices, each electric device comprising:
       a power input,
       a load adapted to consume power received at the power input, and
       a processor operatively connected to the load, the processor being configured to:
          generate a data packet comprising a field containing an identity of the electric device,
          encode the data packet in digital words, and
          cause the load to vary a power level received at the power input, the power level being varied between a first intensity corresponding to first logical values of the digital words and a second intensity corresponding to second logical values of the digital words;

a power distribution unit, PDU, comprising:
  a plurality of output sockets connectable to power inputs of respective electric devices, via respective power lines, for providing power from the PDU to the respective electric devices, and
  a power level sensor adapted to sense power levels at each of the output sockets and to generate successive power level data based on the sensed power levels; and
an identification module operatively connected to the PDU, the identification module comprising a decoder adapted to:
  receive, from the PDU:
    a socket number of a given output socket connected via a given power line to a given electric device, and
    successive power level data obtained on the given output socket,
  monitor the successive power level data reported by the PDU for decoding the identity of the given electric device, and
  transmit, to the database, a reference between the identity of the given electric device, an identity of the PDU and the socket number.

14. The power distribution system of claim 13, wherein:
the PDU is one of a plurality of PDUs; and
the PDU is configured to transmit the identity of the PDU to the identification module with the socket number of the given output socket and with the successive power level data obtained on the given output socket.

15. The power distribution system of claim 13, wherein the PDU is adapted to receive power from a main power source via a main power line.

16. The power distribution system of claim 13, wherein the database is adapted to store the reference between the identity of the electric device, the identity of the PDU and the socket number.

17. The power distribution system of claim 13, wherein the processor of the electric device is further configured to:
  generate a first clock sequence defining alternating phases at a first predetermined clock rate; and
  generate the data packet by aligning a timing of successive logical values contained in the data packet with the alternating phases of the first clock sequence.

18. The power distribution system of claim 17, wherein the PDU is further adapted to:
  generate a second clock sequence defining alternating phases at a second predetermined clock rate nominally equal to the first predetermined clock rate of the first clock sequence generated at each electric device; and
  aggregate the sensed power levels obtained over each phase of the second clock sequence to produce the successive power level data at successive phases of the second clock sequence.

19. The power distribution system of claim 18, wherein the processor of the electric device is further configured to cause to retransmit, by the electric device, the data packet after completion of a first transmission of the data packet, logical values contained in a retransmission of the data packet being shifted from the alternating phases of the first clock sequence of the electric device by one half of a phase of the first clock sequence.

20. The power distribution system of claim 19, wherein the second clock sequence generated by the PDU is not synchronized with the first clock sequence generated by the processor of the electric device.

21. The power distribution system of claim 13, wherein:
the processor of the electric device is further configured to include, in the data packet, a start of frame field preceding the field containing the identity of the electric device; and
the decoder is further adapted to:
  detect a pattern of the reported successive power level data corresponding to the start of frame field of the data packet, and
  use the reported successive power level data corresponding to the start of frame field of the data packet to calibrate the identification module.

22. The power distribution system of claim 13, wherein:
the digital words are selected from 1-bit words, 2-bit-words, 3-bit words and 4-bit words; and
the processor of the electric device is further configured to cause the load to vary the power level received at the power input between a number of intensities consistent with a number of bits of the digital words.

* * * * *